UNITED STATES PATENT OFFICE.

WALTER WEBER, OF DUSSELDORF, AND FRIEDRICH NOLL, OF BENRATH, GERMANY, ASSIGNORS TO THE FIRM OF HENKEL & CIE., OF DUSSELDORF, GERMANY.

MANUFACTURE OF SODIUM PERCARBONATE.

1,237,128.  Specification of Letters Patent.  Patented Aug. 14, 1917.

No Drawing.  Application filed July 8, 1916.  Serial No. 108,179.

*To all whom it may concern:*

Be it known that we, WALTER WEBER, Ph. D., chemist, and FRIEDRICH NOLL, Ph. D., chemist, citizens of the German Empire, residing, respectively, at Dusseldorf and Benrath, Germany, have invented certain new and useful Improvements in the Manufacture of Sodium Percarbonate, of which the following is a specification.

Our invention refers to the manufacture of sodium percarbonate and more especially to a process for manufacturing it from sodium carbonate and hydrogen peroxid, the particular object of our invention being to produce a substance containing an extraordinarily high percentage of active oxygen.

If hydrogen peroxid is allowed to act upon sodium carbonate, substances are formed which contain, besides sodium carbonate and water, varying quantities of active oxygen. The composition of the said products depends upon the conditions under which they have been formed, and especially upon the strength of the solutions of hydrogen peroxid employed, upon the relation between the quantities of sodium carbonate and of hydrogen peroxid used, further upon the temperature, at which the process has been carried through, and upon the manner in which the products formed are dried.

We have now ascertained that in all the different products obtained by this reaction the active oxygen forms part of a combination having the formula $$2Na_2CO_3CO_3.3H_2O_2,$$

the products in question being mixtures of the said combination with more or less sodium carbonate. We have succeeded in removing the carbonate admixed by washing.

The said combination of constant definite composition is obtained by adding to a solution of hydrogen peroxid only so much sodium carbonate that not less than 3 molecules of hydrogen peroxid are present in the mixture for each 2 molecules of sodium carbonate.

We have further ascertained that it does not matter whether sodium carbonate and hydrogen peroxid are used as such or whether these substances are caused to be formed during the process by mutual conversion, for instance from sodium peroxid and sodium bicarbonate, either wholly or partially.

The percarbonate described above offers a great advantage is so far as it contains 32.49 per cent. of hydrogen peroxid and consequently belongs to the most efficient solid combinations of peroxid. On the other hand it does not present the disadvantages common to the mixture of this combination with sodium carbonate which were known heretofore, said disadvantages consisting in a disintegration or subsequent crystallization causing the percentage of oxygen to be changed and, if the products are stored for some time, the original crystalline powder to cake together, hard scraps being then formed.

We are aware that a process for making a sodium percarbonate of the formula $$2Na_2CO_3CO_3.3H_2O_2$$

has been described by Tanatar; however, according to this latter process alcohol is employed for precipitating the said product in such quantities as would render the process uncommercial.

Example I.

To 1000 cbcm. of a solution of hydrogen peroxid containing 10 per cent. $H_2O_2$, 212 g. of sodium carbonate (98 per cent.) are slowly added under stirring, the temperature being kept at about 0 degrees C. The liquid is then sucked off and the precipitate is dried either *in vacuo* or, if little quantities only be treated, with alcohol and ether. There are obtained 220 g. of the salt mentioned above and containing 31.6 per cent. of hydrogen peroxid. The balance of the hydrogen peroxid employed is retained in the mother liquors which are then mixed with concentrated hydrogen peroxid and used in a subsequent operation.

Example II.

To 1000 cbcm. of a solution of hydrogen peroxid containing 10 per cent. $H_2O_2$, which solution may be obtained from sodium peroxid and sulfuric acid, 247 g. of sodium bicarbonate and, after this, 115 g. of sodium peroxid (96 per cent.) are slowly added. The temperature is to be kept at 0 degrees C. and 370 g. of the salt are obtained, the percentage of hydrogen peroxid and the further treatment being the same as described above.

The stability of the salt thus obtained is an extraordinary one in all respects.

We claim:—

1. The method of manufacturing a stable sodium percarbonate with a high percentage of hydrogen peroxid which consists in causing at least 3 molecular proportions of hydrogen peroxid to act upon 2 molecular proportions of sodium carbonate at a temperature of 0° C.

2. The method of manufacturing a stable sodium percarbonate with a high percentage of hydrogen peroxid which consists in causing at least 3 molecular proportions of hydrogen peroxid and 2 molecular proportions of sodium carbonate to be formed in a watery solution and then to react upon each other at a temperature of 0° C.

In testimony whereof we have hereunto set our hands in presence of two subscribing witnesses.

WALTER WEBER. [L. S.]
FRIEDRICH NOLL. [L. S.]

Witnesses:
 HELEN NUFER,
 ALBERT NUFER.

Copies of this patent may be obtained for five cents each, by addressing the "Commissioner of Patents, Washington, D. C."